United States Patent
Gothe

(10) Patent No.: US 12,298,068 B1
(45) Date of Patent: May 13, 2025

(54) ZERO CROSS CONTROL FOR TEMPERATURE-CONTROLLED APPLIANCES

(71) Applicant: True Manufacturing Co., Inc., O'Fallon, MO (US)

(72) Inventor: Dominik Gothe, O'Fallon, MO (US)

(73) Assignee: True Manufacturing Co., Inc., O'Fallon, MO (US)

(*) Notice: Subject to any disclaimer, the term of this patent is extended or adjusted under 35 U.S.C. 154(b) by 0 days.

(21) Appl. No.: 18/585,810

(22) Filed: Feb. 23, 2024

(51) Int. Cl.
  *F25D 29/00* (2006.01)
  *H02M 1/00* (2007.01)
  *H02M 1/08* (2006.01)

(52) U.S. Cl.
  CPC .......... *F25D 29/00* (2013.01); *H02M 1/0058* (2021.05); *H02M 1/083* (2013.01); *F25D 2400/40* (2013.01); *F25D 2600/02* (2013.01)

(58) Field of Classification Search
  CPC .. F25D 29/00; F25D 2400/40; F25D 2600/02; H02M 1/083; H02M 1/0058; H02M 1/047
  See application file for complete search history.

(56) References Cited

U.S. PATENT DOCUMENTS

| | | | |
|---|---|---|---|
| 8,154,841 B2 | 4/2012 | Allen et al. | |
| 8,559,154 B2 | 10/2013 | Li et al. | |
| 9,754,744 B2 | 9/2017 | Wan et al. | |
| 9,887,053 B2 | 2/2018 | Zulim et al. | |
| 9,934,923 B2 | 4/2018 | Ahmed et al. | |
| 9,991,075 B2 | 6/2018 | Lenig et al. | |
| 10,121,622 B2 | 11/2018 | Smith et al. | |
| 10,535,482 B2 | 1/2020 | Brandt et al. | |
| 10,998,147 B2 | 5/2021 | Hsu | |
| 11,056,304 B2 | 7/2021 | Lenig et al. | |
| 2014/0374061 A1* | 12/2014 | Beilfuss | F25D 23/12 165/63 |

FOREIGN PATENT DOCUMENTS

| | | | | |
|---|---|---|---|---|
| CN | 214545257 U | * | 10/2021 | ............... H05K 7/20 |
| JP | 04306519 A | * | 10/1992 | |
| JP | H04306519 A | * | 10/1992 | |
| JP | 2002147906 A | * | 5/2002 | |
| JP | 4033628 B2 | * | 1/2008 | ............... H02M 1/42 |
| JP | 2013172620 A | * | 9/2013 | |
| JP | 2019158204 A | * | 9/2019 | |

* cited by examiner

*Primary Examiner* — Harry R Behm
*Assistant Examiner* — Yahveh Comas Torres
(74) *Attorney, Agent, or Firm* — Stinson LLP

(57) ABSTRACT

An appliance controller is operatively connected to a switching device for selectively actuating the switching device to connect a component to the AC power. The appliance controller executes a zero cross control module synchronizing actuation of the switching device with zero crossings of the AC power. The zero cross control module is agnostic to amplitude and frequency of the AC power. For example, the zero cross control module synchronizes actuation of the switching device with zero crossings of the AC power to minimize inrush current to a DC fan or refrigeration compressor. The controller is used to actuate a switching device of the appliance at a switch actuation time determined by the zero cross control module, which yields a phase offset between switching and a true zero cross of the AC power is <±35°.

15 Claims, 10 Drawing Sheets

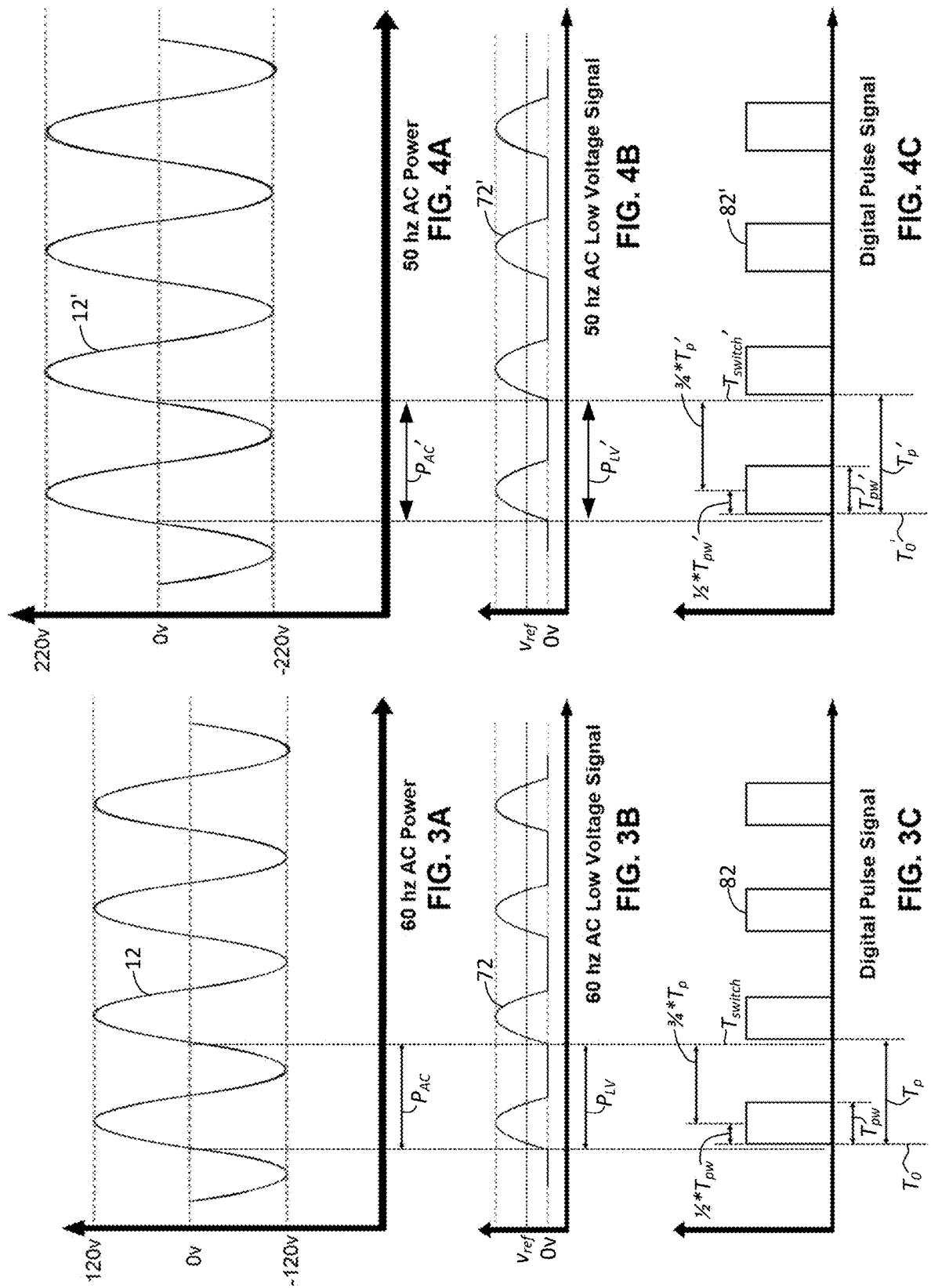

ZERO CROSS CONTROL FOR TEMPERATURE-CONTROLLED APPLIANCES

FIELD

This disclosure generally pertains to temperature-controlled appliances such as refrigeration appliances. More particularly, this disclosure pertains to a low-cost, highly accurate zero cross control for switching devices that selectively connect AC power to powered components of the appliance.

BACKGROUND

Temperature-controlled appliances, such as refrigeration appliances, utilize switching devices to selectively actuate powered components by connecting them to a main AC (alternating current) power source. For example, in refrigeration appliances it is common to use mechanical relays to switch on and off a compressor. It is well-known that such mechanical relays can fail due to electrical arcing that occurs as the switching element moves between open and closed. Arcing occurs if the switching device is actuated when the voltage of the AC power is non-zero. The greater the absolute value of the voltage at the switch actuation time, the more severe the arcing can be. The arcing problem is typically resolved by using oversized relays that are more robust than would otherwise be necessary if there was no arcing. This adds cost to the appliance.

Switch actuation timing can also affect the reliability of powered appliance components in other ways. For instance, the appliance industry has recently begun shifting from AC powered fans to DC (direct current) powered fans. These fans have integrated AC-to-DC conversion circuitry that converts the main AC power to DC and drives the fan motor with DC power. As with refrigeration compressors described above, the supply of AC power to these fans can be controlled by switching devices such as mechanical relays, solid state relays, triacs, thyristors, and the like. If these switching devices are actuated when the voltage of the AC power is non-zero, it causes an inrush current. Unfortunately, the AC-to-DC conversion circuitry is proving to be easily damaged by such inrush currents, drastically reducing the useful life of DC fans below expectations.

In view of the foregoing, there is a need for a precise control that synchronizes the timing of actuation of appliance switching devices with "zero crossings" when the voltage of the AC power is approximately zero. Efforts have been made to develop a standalone microcontroller dedicated to zero cross control. Such zero cross controllers sit between the main appliance controller and a switching device. However, employing an additional microcontroller adds undesirable cost and complexity. Furthermore, existing zero cross controllers use algorithms that are frequency- and/or amplitude-dependent. As a result, they are only operable on certain standardized power grids where the AC power has the expected characteristics. If such zero cross controllers were used, for example, in a foreign country where the AC power has different frequency and/or amplitude, they would likely yield worse performance, e.g., greater relay arcing and greater inrush current, than if no zero cross control were provided at all.

SUMMARY

In one aspect, a refrigeration appliance comprises a cabinet. A compression driven refrigeration system cools a load inside the cabinet. The compression-driven refrigeration system comprises a refrigeration circuit charged with refrigerant. The refrigeration circuit comprises a heat absorbing heat exchanger in thermal communication with the load, a heat rejecting heat exchanger thermally isolated from the load, and a compressor for cycling refrigerant between the heat absorbing heat exchanger and the heat rejecting heat exchanger. A fan is configured to move air across one of the heat absorbing heat exchanger and the heat rejecting heat exchanger. A switching device is actuatable to selectively connect one component selected from a group of components consisting of the compressor and the fan to AC power having periodic zero crossings at which voltage of the AC power is zero. An appliance controller is operatively connected to the switching device for selectively actuating the switching device to connect said one component to the AC power. The appliance controller comprises a processor and memory storing processor-executable instructions that, when executed by the processor, configure the processor to execute a zero cross control module synchronizing actuation of the switching device with zero crossings of the AC power. The zero cross control module is agnostic to amplitude and frequency of the AC power.

In another aspect, a temperature-controlled appliance comprises a cabinet. A temperature control device controls temperature of a load inside the cabinet. A DC fan moves air to one of (i) distribute air inside the cabinet or (ii) exchange heat between the temperature control device and an ambient environment. A switching device is actuatable to selectively connect the DC fan to AC power having periodic zero crossings at which voltage of the AC power is zero. An appliance controller is operatively connected to the switching device for selectively actuating the switching device to connect the DC fan to the AC power. The controller comprises a processor and memory storing processor-executable instructions that, when executed by the processor configure the processor to execute a zero cross control module synchronizing actuation of the switching device with zero crossings of the AC power to minimize inrush current to the DC fan.

In another aspect, a method of operating a temperature-controlled appliance comprises using circuitry to process AC power and output a low voltage periodic signal synchronized with the AC power. A comparator is used to compare the low voltage periodic signal to a reference voltage and output a digital pulse signal indicating a relationship between the low voltage periodic signal and the reference voltage. The digital pulse signal has a pulse width and a period. A processor of a controller of the temperature-controlled appliance is used to determine the pulse width and the period. The processor is used to determine a switch actuation time as function of the pulse width and the period. The controller is used to actuate a switching device of the temperature-controlled appliance to connect a powered component of the temperature-controlled appliance to the AC power at the switch actuation time, whereby a phase offset between switching and a true zero cross of the AC power is <±35°.

Other aspects and features will be apparent hereinafter.

DESCRIPTION OF THE DRAWINGS

FIG. 3A is a chart plotting a 60 hz, 120 v AC power;

FIG. 3B is a chart plotting a low voltage signal output from the analog front end after processing the AC power in FIG. 3A;

FIG. 3C is a chart plotting a digital pulse signal indicating a relationship between the low voltage periodic signal of FIG. 3B and a reference voltage $v_{ref}$;

FIG. 4A is a chart plotting a 50 hz, 220 v AC power;

FIG. 4B is a chart plotting a low voltage signal output from the analog front end after processing the AC power in FIG. 4A;

FIG. 4C is a chart plotting a digital pulse signal indicating a relationship between the low voltage periodic signal of FIG. 4B and a reference voltage $v_{ref}$;

Corresponding parts are given corresponding reference numbers throughout the drawings.

DETAILED DESCRIPTION

Figure 1:
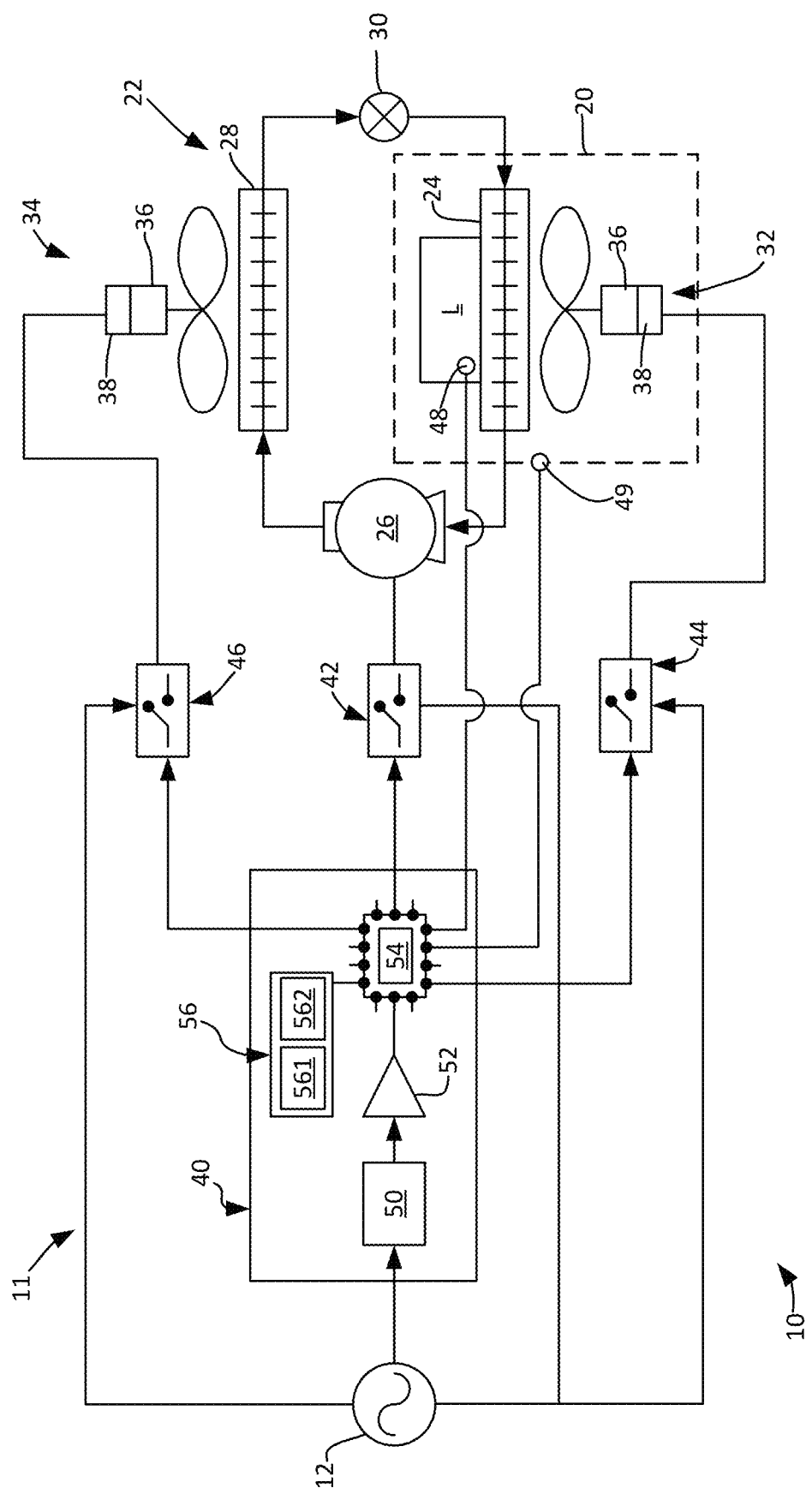
FIG. 1 is a schematic block diagram of a refrigeration appliance in accordance with the present disclosure.

Referring now to FIG. 1, an exemplary embodiment of an appliance in accordance with the present disclosure is generally indicated at reference number 10 and shown schematically. The appliance 10 comprises a control system, generally indicated at 11, configured to perform zero cross control, which minimizes wear and tear on powered components by synchronizing switch actuation with zero crossings of the AC power source 12 when voltage is approximately zero. As will be explained in further detail below, the control system 11 integrates the zero cross control at very low cost, yet the zero cross control is highly accurate across all global power standards because it is agnostic to the amplitude and frequency of the AC power 12. Accordingly, the control system 11 enables large-scale manufacturers to employ a single zero cross solution in appliance products that will be sold and used across the world, which greatly simplifies supply chain management and manufacturing on a global scale. The zero cross control disclosed herein also has value to smaller-scale appliance makers because it is highly accurate and low-cost, providing an inexpensive way to substantially mitigate against the destructive wear caused by arcing and inrush current when switching is not synchronized.

In the illustrated embodiment, the appliance 10 is a temperature-controlled appliance, more particularly a refrigeration appliance. The refrigeration appliance comprises a cabinet, schematically illustrated at 20, configured to at least partially enclose a load L, and at least one refrigeration system 22 charged with a refrigerant and configured for cooling or rejecting heat from the load. Those skilled in the art will recognize that there are various types of refrigeration appliances, including coolers, freezers, ice makers, blast chillers, and combinations thereof. In this disclosure, "refrigeration appliance" may encompass any type of refrigeration appliance. Further, it will be understood that this disclosure is not limited to refrigeration appliances. The refrigeration appliance 10 is depicted by way of example only. This disclosure expressly contemplates that the principles of the control system 11 can be used with other types of temperature-controlled appliances or other kitchen appliances. Further, the principles of this disclosure could be adapted for use with HVAC or HVACR systems.

Appliances in the scope of this disclosure will comprise an appliance controller (including a suitably programmed microprocessor) that selectively actuates one or more switching devices to make AC power connections to powered components of the appliances (e.g., compressors, motors, and the like). For example, food warming cabinets, ovens, grills, and other types of appliances are contemplated within the scope of this disclosure. In certain exemplary embodiments, an appliance in the scope of this disclosure comprises an AC power switching device operatively connected to a DC fan having integrated AC-to-DC conversion circuitry and a DC fan motor. As explained more fully below, the refrigeration appliance 10 is one example of such an appliance, and the control system 11 greatly improves the operative life and reliability of the appliance.

The refrigeration system 22 comprises a complete compression-driven refrigeration circuit, the basic elements of which include a heat absorbing heat exchanger 24 (e.g., an evaporator assembly), a compressor 26 for cycling refrigerant through the refrigeration circuit, a heat rejecting heat exchanger 28 (e.g., a condenser assembly), an expansion device 30, and interconnecting tubing. Those skilled in the art will be familiar with the functions and operations of these basic components (as well as other components) in a compression-driven refrigeration circuit. The evaporator assembly 24 is in thermal communication with the load L for absorbing heat from the load. The condenser assembly 28 is thermally isolated from the load L for rejecting heat from the load, e.g., to an ambient environment.

The illustrated refrigeration appliance 10 further comprises an evaporator fan 32 and a condenser fan 34 configured for moving air across the evaporator assembly 24 and the condenser assembly 28, respectively. In certain exemplary embodiments, one or both of the fans 32, 34 are DC fans comprising a DC motor 36 and integrated AC-to-DC conversion circuitry 38 for converting AC power from the power source 12 into DC power for powering the respective motor.

The control system 11 comprises a temperature controller (broadly, an appliance controller), generally indicated at reference number 40, and one or more switching devices 42, 44, 46 for selectively connecting one or more powered components 26, 32, 34 of the appliance 10 to the AC power 12. In the illustrated embodiment, the control system 11 comprises a switching device 42, 44, 46 operatively connected between the controller 40 and each of the compressor 26, the DC evaporator fan 32, and the DC condenser fan 34. Any suitable type of switching device can be used for any of the switching devices 42, 44, 46. For example, in one or more embodiments, each of the switching devices 42, 44, 46 is a mechanical relay. In certain embodiments, one or more of the switching devices 42, 44, 46 can comprise a solid state relay, a triac, a thyristor, or any other suitable type of switching device. Although three separate switching devices 42, 44, 46 for three separate powered components 26, 32, 34 are shown schematically for purposes of illustration, it will be understood that an appliance can also comprise a single switching device connected to multiple powered components in parallel (e.g., one mechanical relay could be connected to a compressor and an evaporator fan for controlling these components in parallel).

The controller 40 is operatively connected to the switching devices 42, 44, 46 for selectively actuating each switching device to connect the respective powered component (e.g., compressor 26, evaporator fan 32, or condenser fan 34) to AC power 12. In the illustrated embodiment the controller 40 is a temperature controller (or refrigeration controller) that is operatively connected to a temperature sensor 48 in thermal communication with load. The temperature sensor 48 is configured to output a signal representative of a temperature associated with the load L. In an embodiment, the temperature controller 40 uses the signal from the temperature sensor 48 as an input for thermostatic control of the temperature of the load L. More particularly, the controller 40 selectively actuates one or more of the switching devices 42, 44, 46 based on the signal from the temperature sensor 48 to thermostatically control the temperature of the load L. The controller 40 may be configured to control one or more of the switching devices 42, 44, 46 based on other basic appliance control algorithms besides thermostatic control. For example, it is known to control refrigeration appliance components based on timers, defrost control algorithms, condenser cleaning algorithms, ice making cycle algorithms, blast chilling algorithms, and other types of basic appliance control logic. The controller 40 may be configured to control the switching devices 42, 44, 46 based on any of the above, or any others known to those skilled in the art, without departing from the scope of the disclosure The illustrated control system 11 further comprises a door sensor 49 on the cabinet 20 configured to indicate when a door (not shown) of the cabinet is opened. The controller 40 is operatively connected to the door sensor 49 to receive signals from the door sensor indicating when the door is open or closed. The controller 40 may be configured to selectively actuate one or more of the switching devices 42, 44, 46 based on the door sensor 49. For example, depending on the type of refrigeration appliance 10, it is known to cycle the compressor 26 and/or evaporator fan 44 off or on when the output from the door switch 49 indicates the cabinet door is open.

The appliance controller 40 comprises an analog front end 50 operatively connected to the AC power source 12, a comparator 52 operatively connected to the analog front end, a microprocessor 54 operatively connected to the analog front end, and a memory 56 in operative communication with the microprocessor. The memory 56 stores processor-executable instructions that configure the microprocessor 54 for controlling the appliance 10. For example, the memory 56 stores instructions defining a basic appliance control module 561 that configures the microprocessor 54 to conduct basic appliance control (e.g., thermostatic control, ice making control, blast chilling control, defrost control, and/or maintenance control such as condenser cleaning control) by selectively employing the powered components 26, 32, 34 of the appliance based on inputs received from appliance sensors 48, 49, timers, and/or user input. Furthermore, the illustrated memory 56 stores processor-executable instructions defining a zero cross control module 562 that, when executed by the microprocessor 54, configures the microprocessor to synchronize actuation of one or more of the switching devices 42, 44, 46 with zero crossings of the AC power 12. In other words, the zero cross control module configures the microprocessor 54 to delay each actuation of a switching device 42, 44, 46 until the voltage of the AC power 12 is approximately zero (e.g., when the phase offset between the switching time and the true zero cross is $<\pm35°$, $<\pm30°$, $<\pm20°$, $<\pm15°$, $<\pm5°$, $<\pm4°$, $<\pm3°$). Additional details about exemplary logic for the zero cross control module 562 are described in further detail below. But in FIG. 1, it can be seen that, in certain embodiments, the zero cross control module 562 and the basic appliance control module 561 are executable by the same microprocessor 54. Because of the elegant simplicity of the zero cross control module 562 and the low-cost analog front end 40 (described in further detail below), effective zero cross control can be achieved without a separate microcontroller dedicated to the task. Hence, the zero cross control module 562 adds no direct cost to an appliance with a digital microcontroller and the overall control system adds only very small incremental hardware cost for the analog front end 50.

Figure 2:
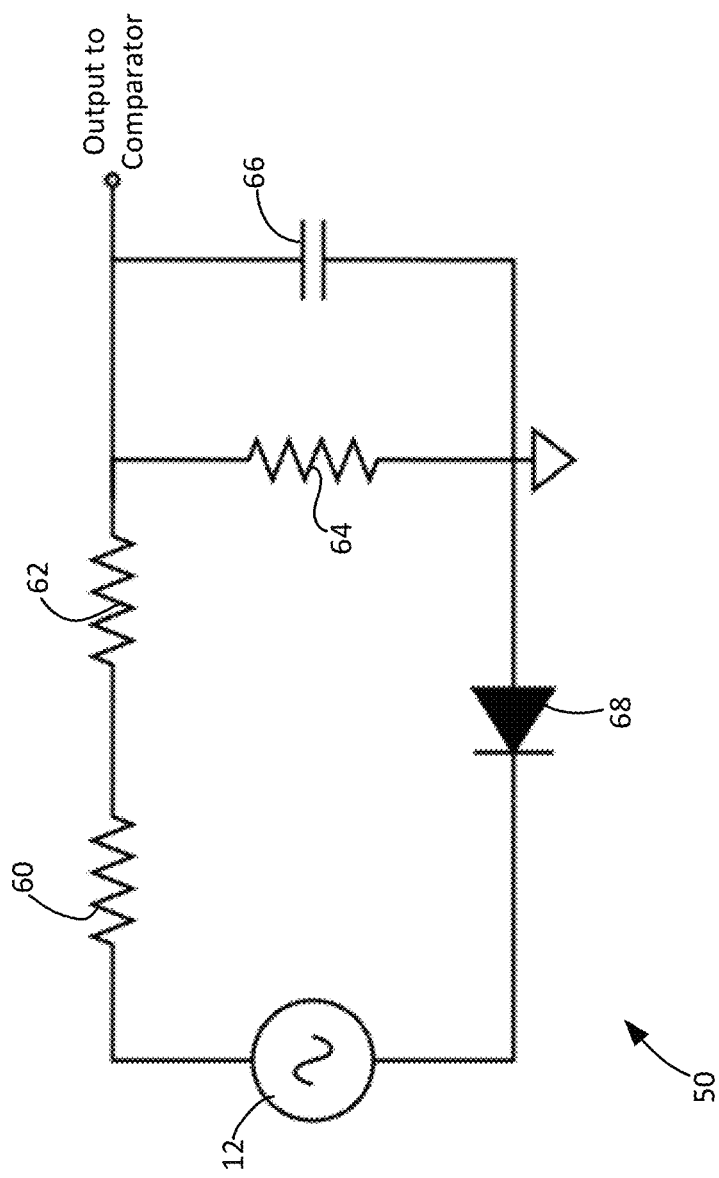
FIG. 2 is a circuit diagram of an analog front end for a controller of the refrigeration appliance.

The analog front end 50 comprises low-cost circuitry configured to process the AC power 12 to output a low voltage periodic signal that is synchronized with the AC power. FIG. 3A illustrates one example of AC power 12 according to North American power standards. FIG. 3B illustrates an exemplary low voltage signal 72 output from the analog front end 50 (as depicted in FIG. 2) after processing the AC power 12 illustrated in FIG. 3A. As can be seen, the illustrated low voltage signal 72 is a rectified half-wave of the AC power 12 with voltage peaks synchronized with the voltage peaks of the AC power and a period $P_{LV}$ synchronized with the period $P_{AC}$ of the AC power.

Referring to FIG. 2, in an exemplary embodiment, the analog front end 50 comprises a voltage divider made up of three resistors 60, 62, 64, a capacitor 66 configured as a capacitive filter for filtering high frequency noise, and a diode 68 configured as a half-wave rectifier for making the low voltage periodic signal 72 a rectified half-wave of the AC power 12 (see FIG. 3B and compare with FIG. 3A). In one exemplary embodiment, the resistors 60, 62, 64 function as 100:1 voltage divider. In this embodiment, the resistor 60 comprises a 499 k resistor, the resistor 62 comprises a 499 k resistor, and the resistor 64 comprises a 10 k resistor. Those skilled in the art will recognize that the circuitry of the illustrated analog front end 50 can be produced very inexpensively, e.g., for on the order of a few cents or less.

Referring to FIGS. 3B and 3C, the comparator 52 is configured to compare the low voltage periodic signal 72 from the analog front end 50 to a reference voltage $v_{ref}$ and output to the processor 54 a digital pulse signal 82 indicating a relationship between the low voltage periodic signal 72 and the reference voltage $v_{ref}$. As shown in FIG. 3B, the reference voltage $v_{ref}$ is set to be greater than 0 and less than the peak voltage of the low voltage signal 72 from the analog front end 50. In the illustrated embodiment, the comparator 42 outputs a digital square wave 82 that has a non-zero value whenever the low voltage periodic signal 72 is greater than the voltage reference $v_{ref}$. The digital pulse signal 82 has a pulse width $T_{pw}$ and a period $T_p$.

The microprocessor 54 executing the zero cross control module 562 is configured to determine the pulse width $T_{pw}$ and the period $T_p$ and determine a switch actuation time $T_{switch}$ as a function of the pulse width and the period. In one or more embodiments, the zero cross control module 562 configures the processor 54 to store and/or periodically update values for the pulse width $T_{pw}$ and the period $T_p$ in the memory 56. More particularly, the zero cross control module 562 configures the processor 54 to actuate each switching device 60, 62, 64 at a switch actuation time $T_{switch}$ after a rising edge $T_0$ of the pulse signal 82. In an exemplary embodiment. time $T_{switch}$ is determined as a function of one-half the pulse width $T_{pw}$ and three-fourths the period $T_p$, e.g., according to the following Equation 1.

$$T_{switch} = \frac{1}{2} * T_{pw} + \frac{3}{4} * T_p - T_{delay} \qquad \text{Equation 1}$$

wherein:

$T_{switch}$ is the switch actuation time;
$T_{pw}$ is the pulse width;
$T_p$ is the period; and
$T_{delay}$ is a predetermined delay.

Triggering on a rising edge $T_0$ and adding half the pulse width $T_{pw}$ anchors the timing precisely at the peak of the low voltage signal 72, which as explained above, is synchronized with the peak of the AC power 12. The peak of the AC power 12 occurs at a phase angle of 90°, or one-fourth of the period $P_{AC}$. Because the period $T_p$ of the pulse signal 82 is equal to the period $P_{LV}$ of the low voltage signal 12, which in turn is equal to the period $P_{AC}$ of the AC power 12, advancing the time by an additional three quarters of the period $T_p$ advances three-fourths of the AC power period $P_{AC}$, from the peak voltage (90° phase angle) (established as one-half the pulse width $T_{pw}$) to the next rising zero cross of the AC power 12 (0° phase angle).

It can be seen that Equation 1 sets the switch actuation time $T_{switch}$ equal to the difference between a true zero cross time (from a rising edge $T_0$, one-half the pulse width $T_{pw}$ plus three-fourths the period $T_p$) minus a predetermined delay $T_{delay}$. The predetermined delay $T_{delay}$ accounts for the inherent lag in the control system 11 caused by analog processing at the front end 50, digital processing in the microprocessor 54, and/or actuation of the switching devices 42, 44, 46. The inventor has found that the delay associated with these functions is substantially deterministic such that an adequate estimate of the delay can be empirically determined in a lab or at the factory and then hard-coded into the zero cross control module 562. Or alternatively, the zero cross control module 562 can be configured to run a self-learning function to set the predetermined delay $T_{delay}$ in the field. When the microprocessor 54 accounts for the deterministic delay $T_{delay}$ with reasonable accuracy and actuates a switching device at the switch actuation time $T_{switch}$ according to Equation 1, it consistently synchronizes opening or closing of the switch with zero crossings of the AC power 12 (e.g., the phase offset between the switching time and the true zero cross is repeatably <±35°, <±30°, <±25°, <±20°, <±15°, <±5°, <±4°, or <±3°. This prevents switch actuation from ever occurring at or near the peak voltage of the AC power 12, thereby minimizing inrush current and arcing at the switch.

The pulse signal 82 is affected by three variables: (1) the frequency (period) of the AC power; (2) the amplitude (voltage) of the AC power; and (3) the comparator voltage reference $V_{ref}$. Variables (1) and (2) vary with different types of AC power. Variance in variable (3) is an inherent consequence of manufacturing tolerances in low cost circuitry components. However, the zero cross module 562 is agnostic to variations in frequency and amplitude of the AC power 12, and also to variation in the voltage reference $V_{ref}$ of the comparator 52.

Even if the same voltage reference $V_{ref}$ could be guaranteed in all cases, variations in frequency and voltage across different power standards would create differences in the pulse signal 82. Adding half the pulse width $T_{pw}$ to the rising edge trigger time $T_0$ establishes the peak of the AC power wave form 12 without fail. But even with this information, without knowing the frequency of the AC power 12, it would not be possible to reliably determine a zero cross. One might suggest hard-coding the control based on a standard frequency of the AC power 12, e.g., 60 Hz in North America, but this will impose an unnecessary geographic constraint on the control system.

Since the period $T_p$ of the pulse signal 82 is equal to the period $P_{AC}$ of the AC power, it warrants consideration as a zero cross control input. The challenge comes, however, with measuring the time delay between the true zero cross and the pulse trigger $T_0$ that initiates the pulse period $T_p$. Again, it is possible to calibrate to a particular voltage and frequency but this would result in an unnecessary geographic constraint. Additionally, an algorithm based strictly on the pulse period $T_p$ and geographically constrained constants for voltage and frequency would not make proper account for variable (3): the comparator voltage reference $v_{ref}$. On paper, it is possible to assume voltage reference $v_{ref}$ is fixed at, e.g., 0.3 v. But in reality there is variation due to manufacturing tolerances, and this variance in trigger level would result in a variance in timing if it is not accounted for.

By combining the pulse width $T_{pw}$ and the period $T_p$, both variables (1) and (2) (the frequency and amplitude of the AC power 12) are accounted for. Moreover, combining the pulse width $T_{pw}$ and the period $T_p$ as set forth herein also cancels out the effect of variable (3), variance in the reference voltage trigger level $v_{ref}$. The wave form of the AC power 12 is fully defined by variables (1) and (2) and is not affected by the variance in the comparator 54 (variable (3)). Regardless of the true voltage $v_{ref}$, advancing from a rising edge of a pulse $T_0$ by one-half of the pulse width $T_{pw}$ will establish a 90-degree phase of the AC power sine wave 12, that is, peak voltage. Additionally, regardless of the true voltage $v_{ref}$, the square wave period $T_p$ will always be the same and will always equal the period $P_{AC}$ of the AC power 12. Thus, variance in the comparator reference voltage $v_{ref}$ does not affect the period $T_p$ or the accuracy of the proposition that one-half of the pulse width $T_{pw}$ corresponds to a 90-degree phase of the AC power where there is peak voltage.

Accordingly, from any given rising edge $T_0$ of the pulse signal 82, the next zero cross of the AC power 12 will always occur after one-half the pulse width $T_{pw}$ and one-fourth the period $T_p$. From this initial zero cross, each subsequent zero cross will occur after each additional one-half period $T_p$. In Equation 1, the inventor chose to use three-fourths of one period $T_p$ in order to allow sufficient time for subtracting the predetermined delay $T_{delay}$. It is contemplated, however, that in other embodiments, the multiple applied to the period $T_p$ in a zero cross function could be any number equal to (¼+n*½), wherein n is an integer.

By comparing FIGS. 3A-3C with FIGS. 4A-4C, it can be seen that the zero cross control provided by the control system 11 is truly agnostic to the voltage and frequency of the AC power. FIG. 3A depicts standard North American 60 hz, 120 v AC power 12, whereas FIG. 4A depicts standard European 50 hz, 220 v AC power 12'. Using the same analog front end 50, the control system 11 is configured to generate suitable low voltage periodic signals 72, 72' for each type of AC power 12, 12', wherein each low voltage signal 72, 72' has voltage peaks synchronized with the voltage peaks of the respective AC power 12, 12' and a period $P_{LV}$, $P_{LV}'$ synchronized with the period $P_{AC}$, $P_{AC}'$ of the respective AC power. Using the comparator 52, the control system 11 is configured to generate a suitable digital pulse signal 82, 82' having a pulse width $T_{pw}$, $T_{pw}'$ and period $T_p$, $T_p'$ configured so that, from a rising edge $T_0$, $T_0'$ of the digital pulse signal 82, 82', tolling one-half the respective pulse width $T_{pw}$, $T_{pw}'$ establishes the peak voltage (90° phase angle) of the respective power signal 12, 12', and further tolling three-fourths the respective period $T_p$, $T_p'$ establishes the next rising zero cross (0° phase angle) of the of the respective AC power signal 12, 12'. Accordingly, regardless of the frequency and amplitude of the AC power, the controller 40 is configured to determine an effective switch actuation time $T_{switch}$ from Equation 1.

One exemplary method of using the appliance 10 of FIG. 1 will now be briefly described. The appliance controller 40 executes the appliance control module 561 to run various powered components of the appliance in accordance with the objectives for the appliance. Whenever the appliance control module 561 calls for actuating a switching device 42, 44, 46 to connect one of the powered components to AC power 12, the zero cross module 562 is used to synchronize switch actuation with a zero crossing of the AC power. The analog front end 50 continuously processes the AC power 12 to output the low voltage periodic signal 72, and the comparator 52 compares the low voltage periodic signal to the reference voltage $v_{ref}$ to output the digital pulse signal 82 indicating the relationship between the low voltage periodic signal and the reference signal. The processor 54 executing the zero cross control module 562 stores and/or periodically updates values for the pulse width $T_{pw}$ and the period $T_p$ in the memory 56. When the appliance control module 561 calls for a switch device actuation, the microprocessor 54 executing the zero cross module 562 delays actuation of the switching device 42, 44, 46 until a switch actuation time $T_{switch}$. More particularly, the processor determines the switch actuation time $T_{switch}$ from a rising edge $T_0$ of the digital pulse signal 82 according with Equation 1. Subsequently, the controller 40 actuates the switching device 42, 44, 46 to connect the respective powered component 26, 32, 34 to AC power at the switch actuation time $T_{switch}$. By this process, every time the appliance controller 40 actuates a switching device 42, 44, 46, the switching device opens or closes at approximately the zero crossing (e.g., switching repeatably occurs with a phase offset from the true zero crossing <±45°, <±30°, <±15°, <±15°, <±5°, <±4°, <±3°).

Examples

Figure 5A:
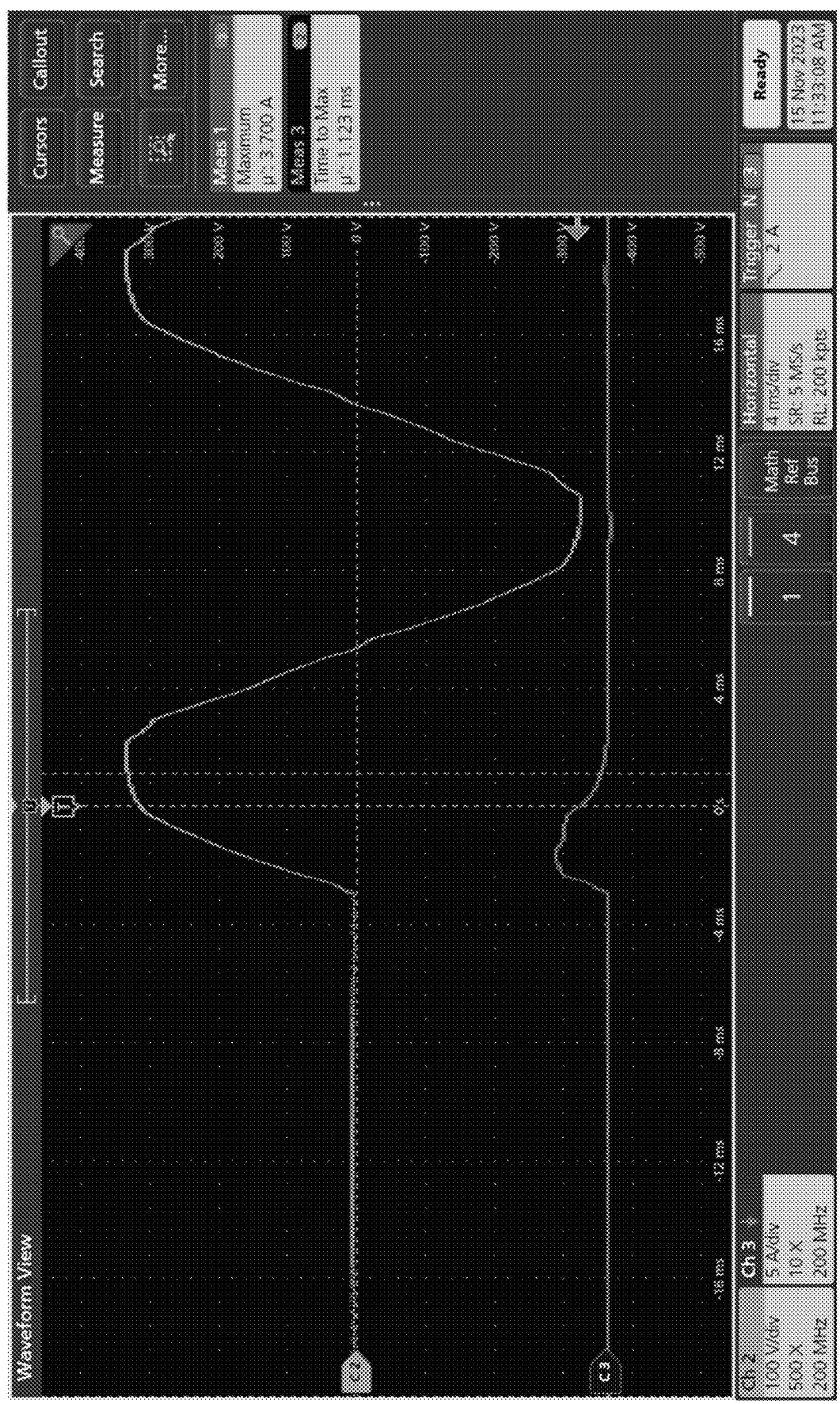
FIG. 5A is a plot generated by a Tektronix measurement instrument showing AC power and inrush current to load from a 240 v, 60 hz power source after actuation of a switching device by a zero cross control module of the present disclosure.
Figure 5B:
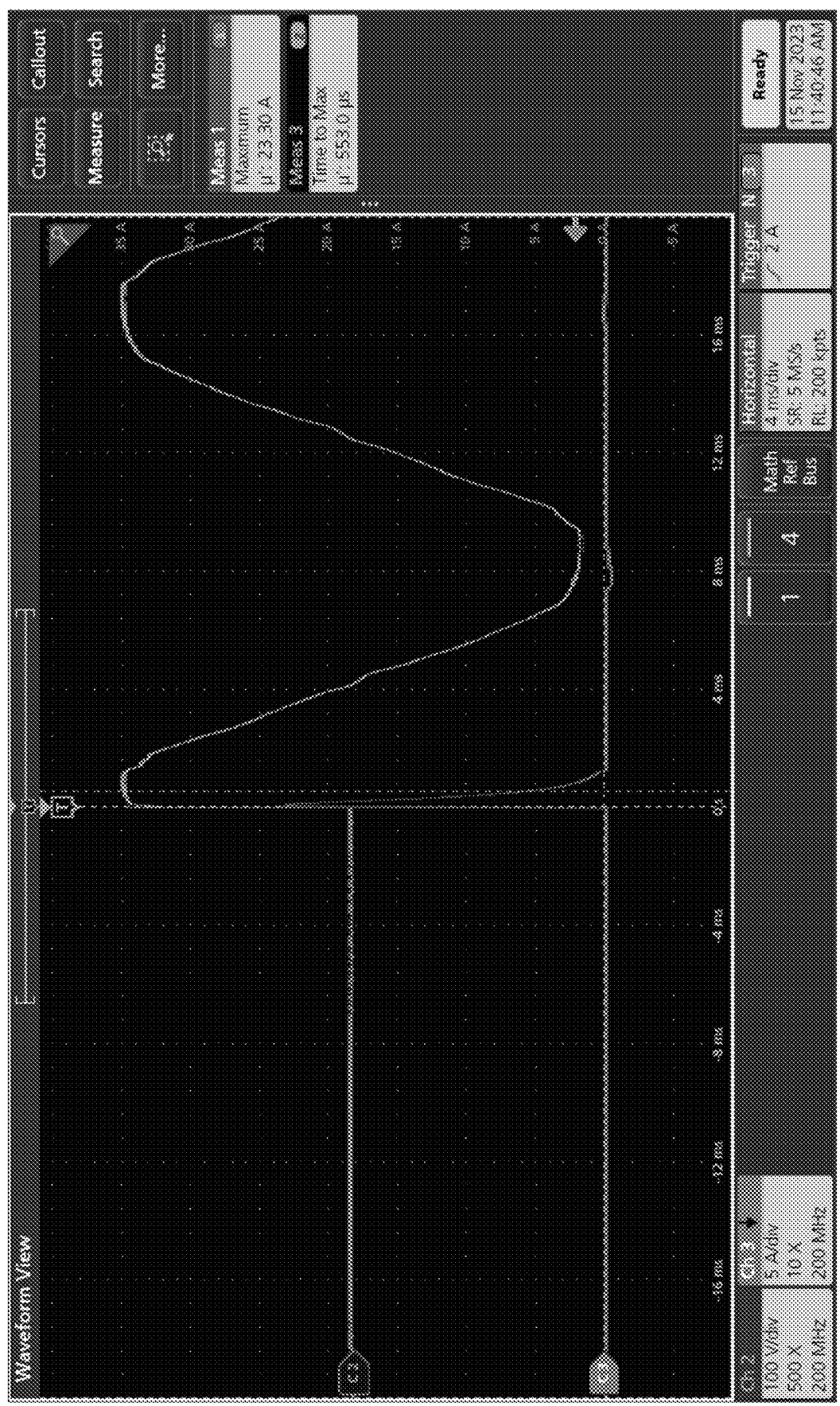
FIG. 5B is a plot generated by a Tektronix measurement instrument showing AC power and inrush current to load from a 240 v, 60 hz power source after actuation of a switching device by a conventional control module at near-peak voltage.

Referring to FIGS. 5A and 5B, an experiment was conducted to assess the effect of the zero cross control module 562 on inrush current to a DC fan motor. AC power at 240 v, 60 hz was connected to a mechanical relay, which in turn was connected to the DC fan motor. The voltage and current to the fan motor was monitored as the mechanical relay was switched from open to closed in order to connect the DC fan motor to the AC power. FIG. 5A shows the data obtained when the mechanical relay was controlled using the appliance controller 40 and zero cross module 562. The top line represents voltage and the bottom line represents inrush current. As can be seen, using the zero cross control module 562, the relay closed at approximately 0 v. As a result, the maximum inrush current was only 3.7 A. By comparison, FIG. 5B shows the data obtained when zero cross control was not used and the mechanical relay switched the fan motor on at approximately peak voltage. The inrush current to the fan motor was substantially greater, 23.3 A.

Figure 6:
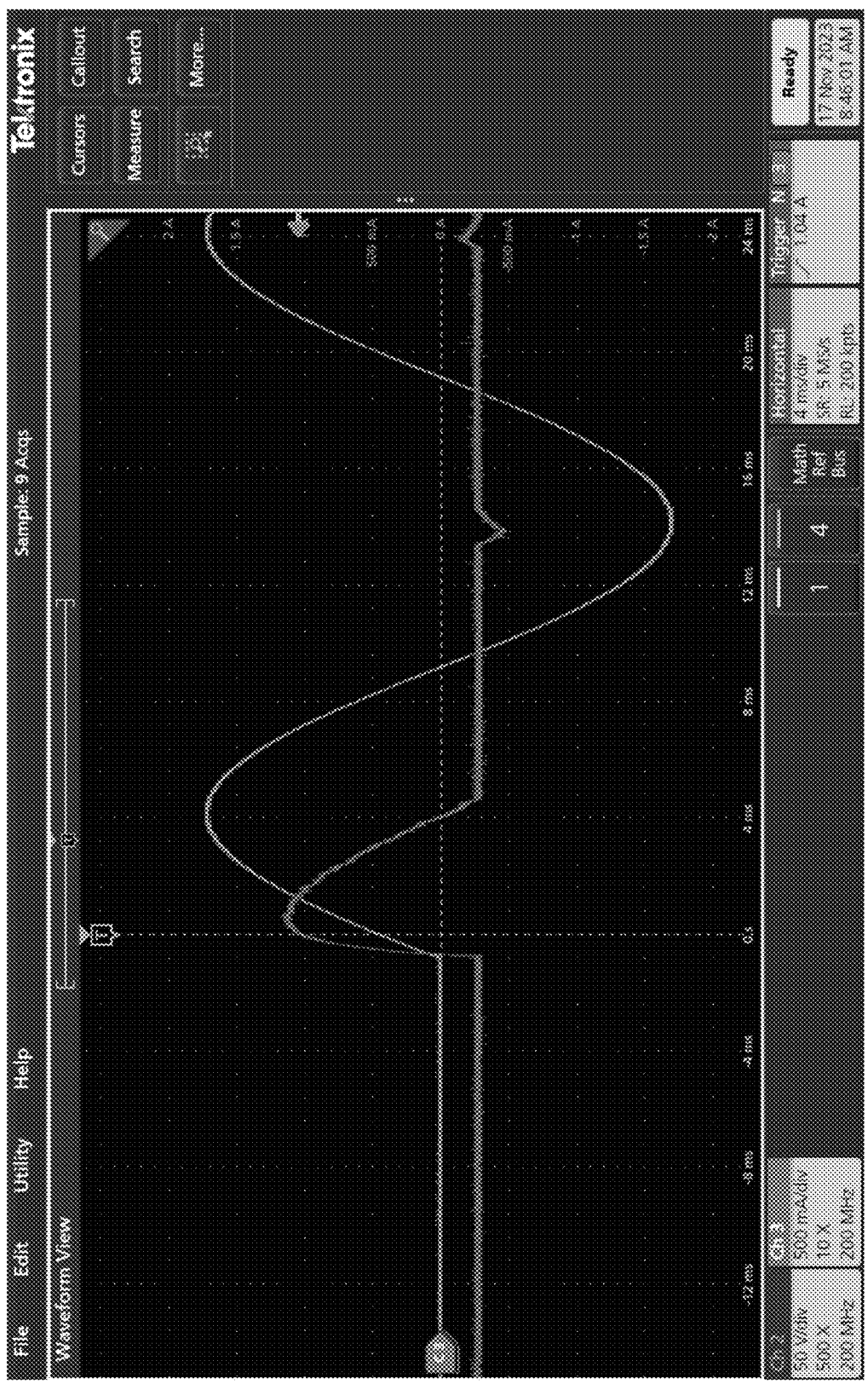
FIG. 6 is a plot generated by a Tektronix measurement instrument showing AC power and inrush current to load from a 120 v, 50 hz power source after actuation of a switching device by a zero cross control module of the present disclosure.
Figure 7:
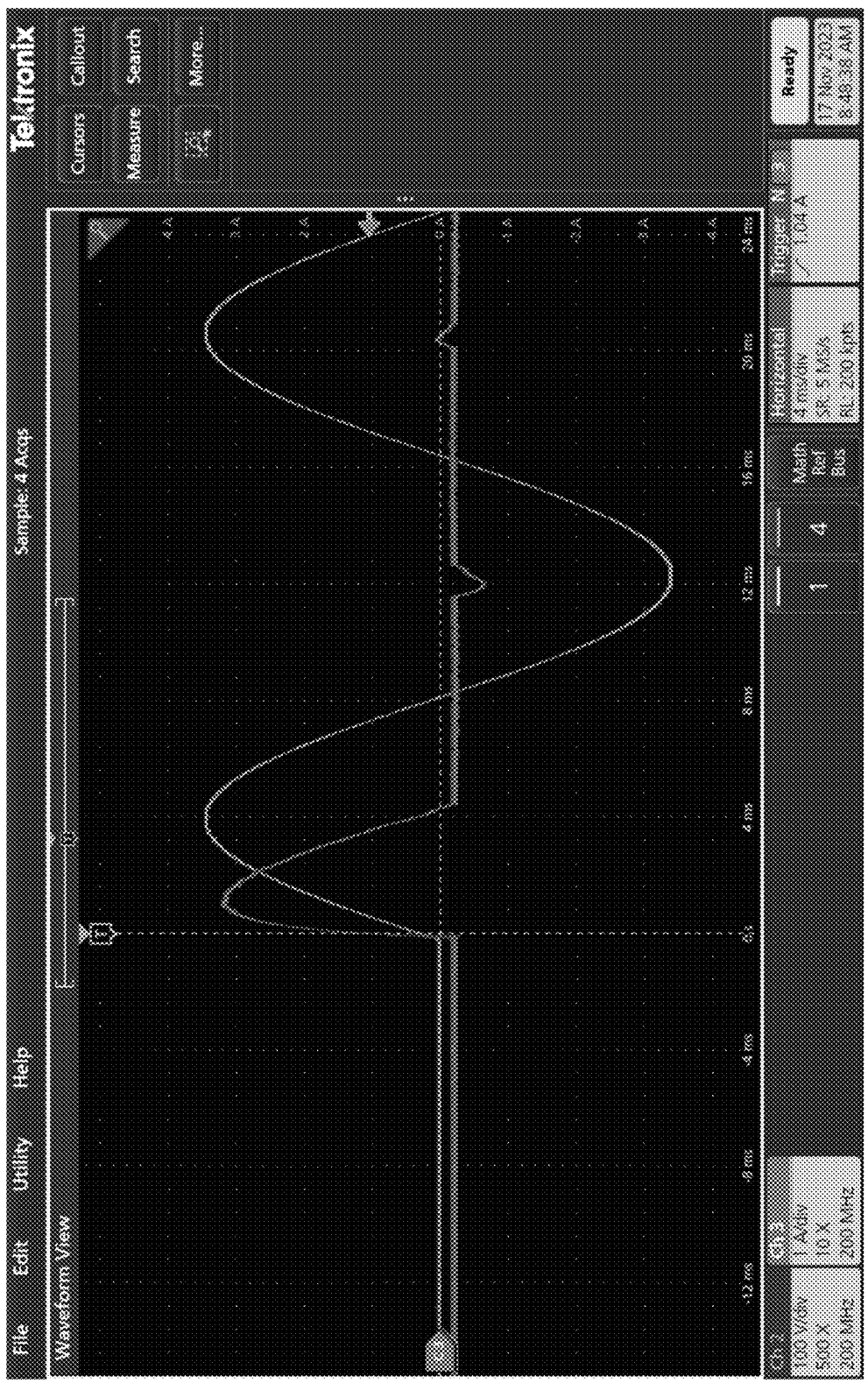
FIG. 7 is a plot generated by a Tektronix measurement instrument showing AC power and inrush current to load from a 240 v, 60 hz power source after actuation of a switching device by a zero cross control module of the present disclosure.
Figure 8:
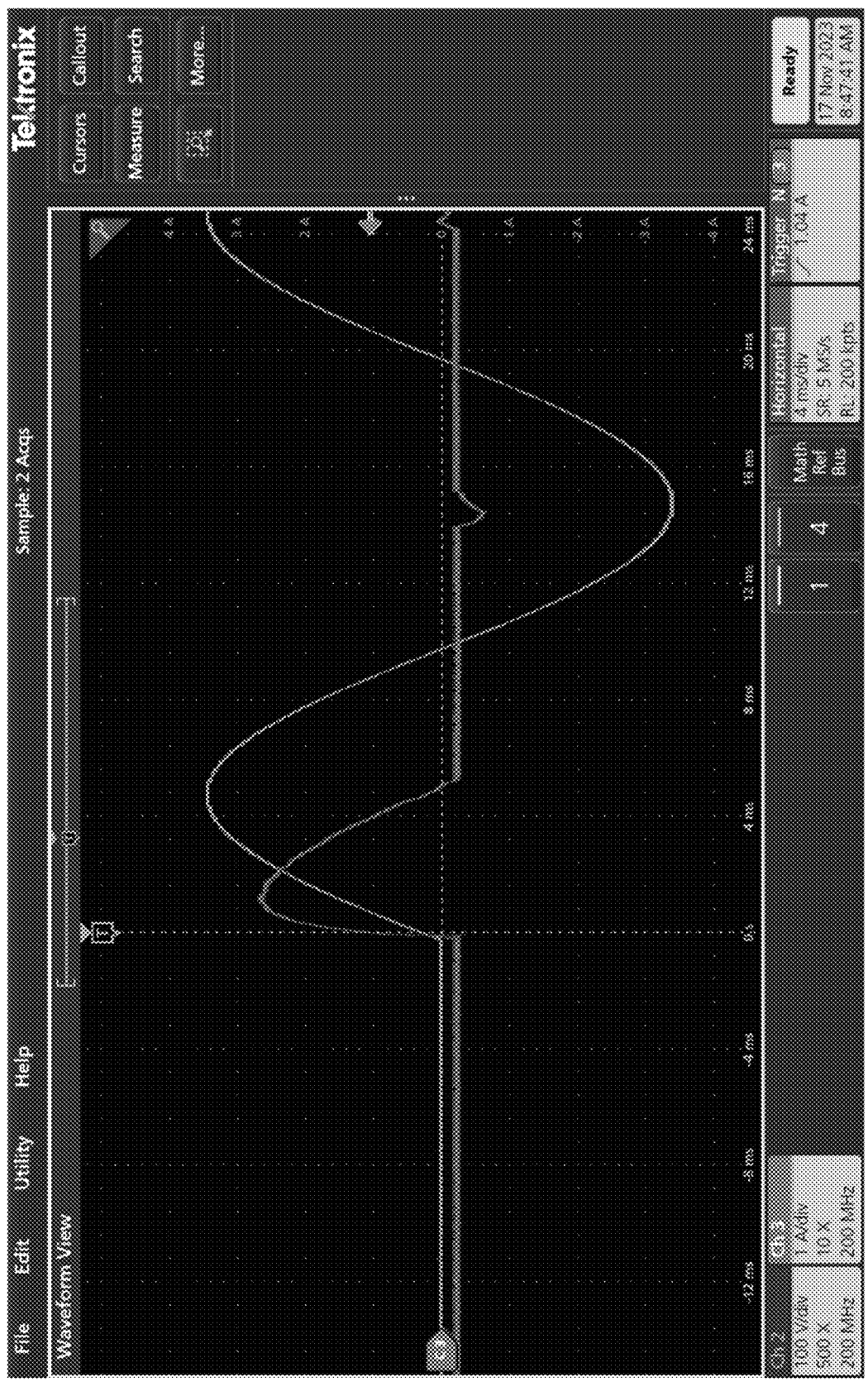
FIG. 8 is a plot generated by a Tektronix measurement instrument showing AC power and inrush current to load from a 240 v, 50 hz power source after actuation of a switching device by a zero cross control module of the present disclosure.
Figure 9:
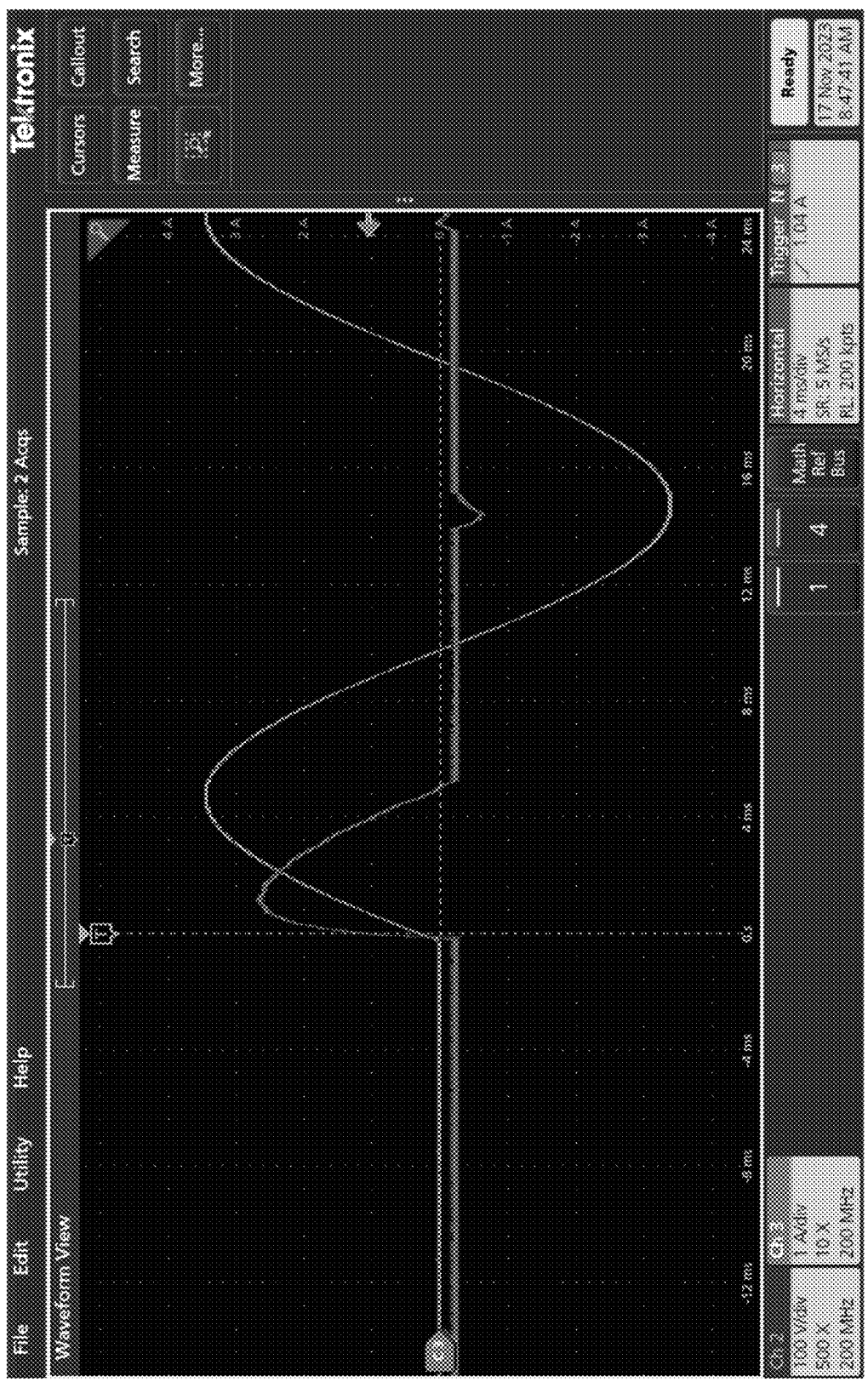
FIG. 9 is a plot generated by a Tektronix measurement instrument showing AC power and inrush current to load from a 120 v, 60 hz power source after actuation of a switching device by a zero cross control module of the present disclosure.

Referring to FIGS. 6-9, further experiment were conducted to confirm that zero cross control module was agnostic to the amplitude and frequency of AC power. FIG. 6 shows the results when the appliance controller 40 comprising the zero cross control module 562 was used to close a mechanical relay to connect a load to AC power (top line) at 120 v and 50 hz. As shown, the using the zero cross control module 562, the relay closed at approximately 0 v and limited maximum inrush current to less than 1.5 A. FIG. 7 shows the results when the appliance controller 40 comprising the zero cross control module 562 was used to close a mechanical relay to connect a load to AC power (top line) at 240 v and 60 hz. As shown, the using the zero cross control module 562, the relay closed at approximately 0 v and limited maximum inrush current to less than 3.5 A. FIG. 8 shows the results when the appliance controller 40 comprising the zero cross control module 562 was used to close a mechanical relay to connect a load to AC power (top line) at 240 v and 50 hz. As shown, the using the zero cross control module 562, the relay closed at approximately 0 v and limited maximum inrush current to less than 3 A. FIG. 9 shows the results when the appliance controller 40 comprising the zero cross control module 562 was used to close a mechanical relay to connect a load to AC power (top line) at 120 v and 60 hz. As shown, the using the zero cross control module 562, the relay closed at approximately 0 v and limited maximum inrush current to less than 1.5 A. Accordingly, it can be seen that the zero cross control module 562 is agnostic to the amplitude and frequency of AC power (e.g., the zero cross control module is configured to limit inrush current to less than 10 A, less than 9 A, less than 8 A, less than 7 A, less than 6 A, less than 5 A, and/or less than 4 A across a range of AC power signals including at least (i) 240 v, 60 hz AC power, (ii) 240 v, 50 hz AC power, (iii) 120 v, 50 hz AC power, and (vi) 120 v, 60 hz AC power. Moreover, the zero cross control module 562 can accomplish this without any adjustment of its software or hardware from one AC power type to the next.

Figure 10:
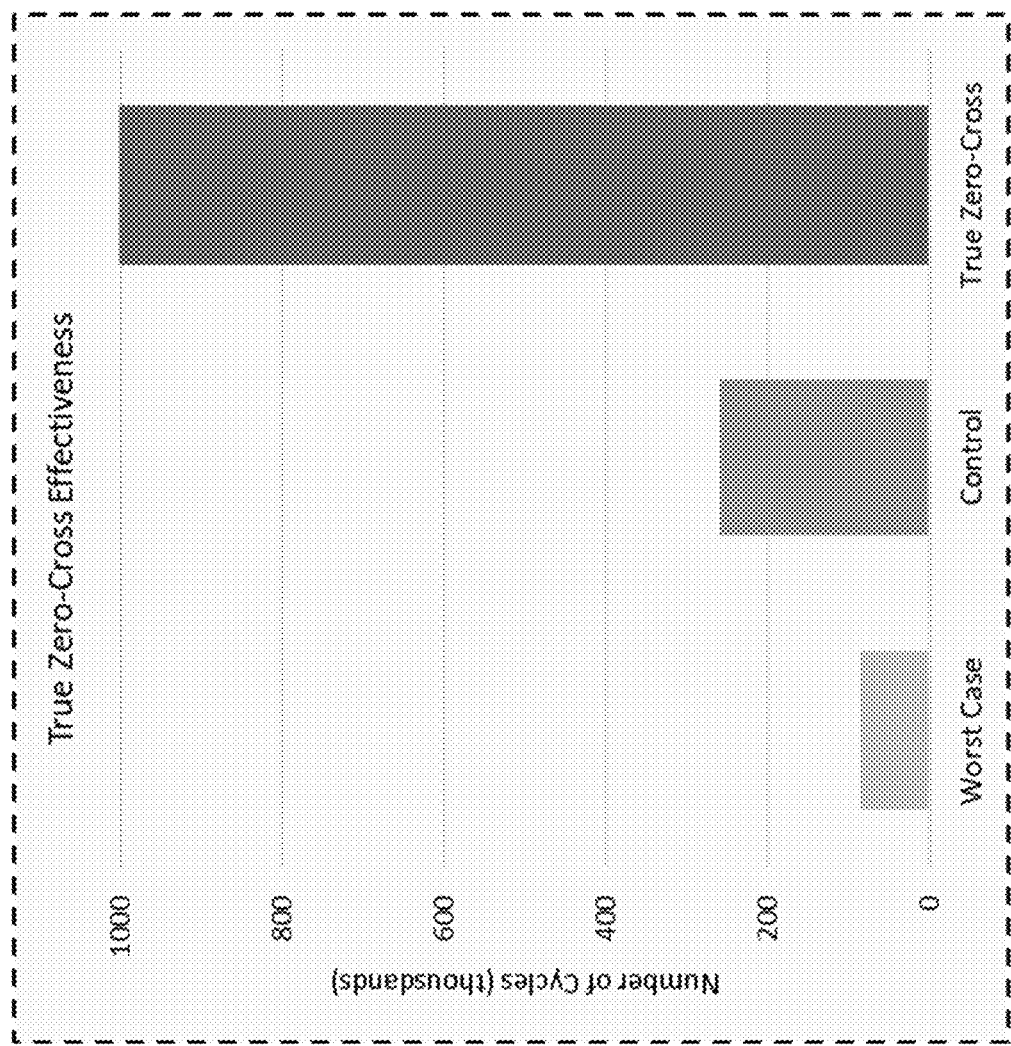
FIG. 10 is a bar graph showing the cycle life of relays controlled by different control systems including one controlled by the zero cross control module of the present disclosure.

Referring to FIG. 10, another experiment was conducted to test the effectiveness of the control system 11 and zero cross control module 562 on preventing relay damage. In this experiment, three identical relays were connected between a 60 hz AC power source and a resistive load, and each relay was controlled by a different controller. The controller connected to the first relay was specially programmed to repeatably switch the relay 2 ms after a zero cross of the AC power (43° phase angle). As seen in the left bar labeled "Worst Case" in FIG. 10, this relay failed (by arc welding) after less than 100,000 cycles. The controller connected to the second relay was conventional and used as the control for the experiment. Like all conventional relay control system, the control was agnostic to the phase of the AC power and thus switched the relay at random times in relation to the AC power waveform. This relay failed (by arc welding) after less than 300,000 cycles. The controller 40 executing zero cross control module 562 was connected to the third relay. As seen in the right bar of the chart (labeled "True Zero-Cross"), this relay did not fail after 1,000,000 cycles. The test was stopped after 1,000,000 cycles and the relay was examined. No sign of wear or damage was detected upon inspection. Further testing along these lines was conducted to reveal a breakeven point in relation to the control of 1.6 ms (phase angle 35°). Accordingly, it can be seen that the zero cross control module 562 increases useful life of the mechanical relay by at least 100% (e.g., at least about 150%, at least about 200%, at least about 250%, at least about 300%, at least about 400%) when compared with a same type of mechanical relay used under same conditions without the zero cross control module.

Additional tests were conducted to verify that the 'make' and 'break' delay times of various relays (i.e., the time between when the relay is signaled and when the relay either makes or breaks the circuit) are sufficiently consistent that a fixed value, $T_{delay}$, could be reliably used in Equation 1. For each type of relay, the switch was closed and opened a defined number of times, and the make and break time of each actuation was measured. The test revealed that the standard deviations of the make and break delays of several models of mechanical relays are less than 500 microseconds, some less than 100 microseconds, such that the make and break are sufficiently deterministic for Equation 1 to be effective based on a predetermined value for $T_{delay}$.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A refrigeration appliance, the refrigeration appliance comprising: a cabinet; a compression driven refrigeration system for cooling a load inside the cabinet, the compression-driven refrigeration system comprising a refrigeration circuit charged with refrigerant, the refrigeration circuit comprising a heat absorbing heat exchanger in thermal communication with the load, a heat rejecting heat exchanger thermally isolated from the load, and a compressor for cycling refrigerant between the heat absorbing heat exchanger and the heat rejecting heat exchanger; a fan configured to move air across one of the heat absorbing heat exchanger and the heat rejecting heat exchanger; a switching device actuatable to selectively connect one component selected from a group of components consisting of the compressor and the fan to AC power having periodic zero crossings at which voltage of the AC power is zero; and an appliance controller operatively connected to the switching device for selectively actuating the switching device to connect said one component to the AC power, the appliance controller comprising a processor and memory storing processor-executable instructions that, when executed by the processor, configure the processor to execute a zero cross control module synchronizing actuation of the switching device with zero crossings of the AC power, the zero cross control module being agnostic to amplitude and frequency of the AC power; wherein the appliance controller further comprises an analog front end operatively connected to the AC power, the analog front end configured to process the AC power to output a low voltage periodic signal synchronized with the AC power; wherein the appliance controller further comprises a comparator operatively connected to the analog front end and the processor, the comparator configured to compare the low voltage periodic signal to a reference voltage and output to the processor a digital pulse signal indicating a relationship between the low voltage periodic signal and the reference voltage; wherein the digital pulse signal has a pulse width and a period, wherein the zero cross control module is configured to determine a duration of the pulse width and a duration of the period and determine a switch actuation time of the switching device as function of the duration of the pulse width and the duration of the period.

2. The refrigeration appliance of claim 1, wherein the zero cross control module is configured to determine switch actuation time as a function of a predetermined delay associated with one or more of the analog front end, the processor executing the processor-executable instructions, and actuation of the switching device.

3. The refrigeration appliance of claim 2, wherein the zero cross control module is configured to determine the switch actuation time according to a function:

$$T_{switch} = \frac{1}{2} * T_{pw} + \frac{3}{4} * T_p - T_{delay}$$

wherein:
$T_{switch}$ is the switch actuation time;
$T_{pw}$ is the duration of the pulse width;
$T_p$ is the duration of the period; and
$T_{delay}$ is the predetermined delay.

4. The refrigeration appliance of claim 1, wherein the analog front end comprises a voltage divider.

5. The refrigeration appliance of claim 1, wherein the analog front end comprises a capacitive filter configured to filter out high frequency noise.

6. The refrigeration appliance of claim 1, wherein the switching device is a mechanical relay and wherein the zero cross control module increases useful life of the mechanical relay by at least 100% when compared with a same type of mechanical relay used under same conditions without the zero cross control module.

7. The refrigeration appliance of claim 1, wherein the zero cross control module is further configured to determine a rising edge of the digital pulse signal and to trigger switch actuation by tolling the switch actuation time from the rising edge of the digital pulse signal.

8. The refrigeration appliance of claim 1, wherein the switching device is a normally open mechanical relay and wherein the zero cross control module is configured to repeatably synchronize closings of the mechanical relay with zero crossings of the AC power such that each closing of the mechanical relay has a phase offset from a respective zero crossing less than 35°.

9. The refrigeration appliance of claim 8, wherein the zero cross control module is configured to determine the rising edge of the digital pulse independently of determining the pulse width.

10. The refrigeration appliance of claim 1, wherein the switching device is actuatable to selectively connect the fan to the AC power;
wherein the fan is a DC fan;
wherein the zero cross control module synchronizes actuation of the switching device with zero crossings of the AC power to minimize inrush current to the DC fan.

11. The refrigeration appliance of claim 10, wherein the DC fan comprises a DC motor and AC-to-DC conversion circuitry connected between the switching device and the DC motor.

12. The refrigeration of claim 10, wherein the zero cross control module is configured to determine switch actuation time as a function of a predetermined delay associated with one or more of the analog front end, the processor executing the processor-executable instructions, and actuation of the switching device.

13. The refrigeration appliance of claim 12, wherein the zero cross control module is configured to determine switch actuation time according to a function:

$$T_{switch} = \frac{1}{2} * T_{pw} + \frac{3}{4} * T_p - T_{delay}$$

wherein:
- $T_{switch}$ is the switch actuation time;
- $T_{pw}$ is the duration of the pulse width;
- $T_p$ is the duration of the period; and
- $T_{delay}$ is the predetermined delay.

14. A refrigeration appliance, the refrigeration appliance comprising:
   a cabinet;
   a compression driven refrigeration system for cooling a load inside the cabinet, the compression-driven refrigeration system comprising a refrigeration circuit charged with refrigerant, the refrigeration circuit comprising a heat absorbing heat exchanger in thermal communication with the load, a heat rejecting heat exchanger thermally isolated from the load, and a compressor for cycling refrigerant between the heat absorbing heat exchanger and the heat rejecting heat exchanger;
   a fan configured to move air across one of the heat absorbing heat exchanger and the heat rejecting heat exchanger;
   a switching device actuatable to selectively connect one component selected from a group of components consisting of the compressor and the fan to AC power having periodic zero crossings at which voltage of the AC power is zero; and
   an appliance controller operatively connected to the switching device for selectively actuating the switching device to connect said one component to the AC power, the appliance controller comprising a processor and memory storing processor-executable instructions that, when executed by the processor, configure the processor to execute a zero cross control module synchronizing actuation of the switching device with zero crossings of the AC power, the zero cross control module being agnostic to amplitude and frequency of the AC power;
   wherein the appliance controller further comprises an analog front end operatively connected to the AC power, the analog front end configured to process the AC power to output a low voltage periodic signal synchronized with the AC power;
   wherein the analog front end comprises a diode configured to make the low voltage periodic signal a rectified half-wave of the AC power.

15. A method of operating a temperature-controlled appliance, the method comprising: using circuitry to process AC power and output a low voltage periodic signal synchronized with the AC power; using a comparator to compare the low voltage periodic signal to a reference voltage and outputting a digital pulse signal indicating a relationship between the low voltage periodic signal and the reference voltage, the digital pulse signal having a pulse width and a period; using a processor of a controller of the temperature-controlled appliance to determine a duration of the pulse width and a duration of the period; using the processor to determine a switch actuation time of a switching device as function of the duration of the pulse width and the duration of the period; and using the controller to actuate the switching device of the temperature-controlled appliance to connect a powered component of the temperature-controlled appliance to the AC power at the switch actuation time, whereby a phase offset between switching and a true zero cross of the AC power is <±35°.

* * * * *